(12) United States Patent
Lumnah et al.

(10) Patent No.: US 12,547,615 B2
(45) Date of Patent: *Feb. 10, 2026

(54) SENSITIVE DATA DISCOVERY FOR DATABASES

(71) Applicant: Rubrik, Inc., Palo Alto, CA (US)

(72) Inventors: Christopher Robert Lumnah, North Providence, RI (US); Frank Schwaak, Recklinghausen (DE); Ganesa Sankar Balabharathi, San Ramon, CA (US); Michael Patrick Oglesby, Indianapolis, IN (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/191,300

(22) Filed: Apr. 28, 2025

(65) Prior Publication Data

US 2025/0258813 A1    Aug. 14, 2025

Related U.S. Application Data

(63) Continuation of application No. 17/705,174, filed on Mar. 25, 2022, now Pat. No. 12,287,782.

(51) Int. Cl.
*G06F 16/245* (2019.01)
(52) U.S. Cl.
CPC ................. *G06F 16/245* (2019.01)

(58) Field of Classification Search
None
See application file for complete search history.

(56) References Cited

U.S. PATENT DOCUMENTS

| | | |
|---|---|---|
| 11,599,667 B1 | 3/2023 | Tutuianu et al. |
| 2015/0143064 A1 | 5/2015 | Bhargava et al. |
| 2016/0092475 A1 | 3/2016 | Stojanovic et al. |
| 2021/0374116 A1 | 12/2021 | Narasimhadevara et al. |

OTHER PUBLICATIONS

Stafford, Gary, "Employing Amazon Macie to Discover and Protect Sensitive Data in your Amazon S3-based Data Lake", Programmatic Ponderings blog, published Mar. 15, 2021, 22 pages. (Year: 2021).

*Primary Examiner* — Scott A. Waldron
(74) *Attorney, Agent, or Firm* — Holland & Hart LLP

(57) ABSTRACT

Techniques for database management are described. A database management system may transmit a request for a data management system of a database to provide a set of metadata attributes for structured data within the database, and may receive a set of metadata attributes for the structured data within the database. The data management system may perform a pattern matching procedure to evaluate the set of metadata attributes for the structured data within the database against one or more patterns associated with a data type to determine one or more locations within the database that include structured data of the data type. Based on the pattern matching procedure, the data management system may output an indication that the one or more locations within the database include structured data of the data type.

20 Claims, 12 Drawing Sheets

SENSITIVE DATA DISCOVERY FOR DATABASES

CROSS REFERENCE

The present Application for Patent is a continuation of U.S. patent application Ser. No. 17/705,174 by LUMNAH et al., entitled "SENSITIVE DATA DISCOVERY FOR DATABASES" and filed Mar. 25, 2022, which is assigned to the assignee hereof and expressly incorporated by reference herein.

FIELD OF TECHNOLOGY

The present disclosure relates generally to database systems and data processing, and more specifically to sensitive data discovery for databases.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A database may further be used to handle the storage, management, and processing of data. In some cases, however, the actual contents of the database may be unknown to the user, which may pose challenges for effectively securing, maintaining. and restoring such database content.

DETAILED DESCRIPTION

Figure 1:
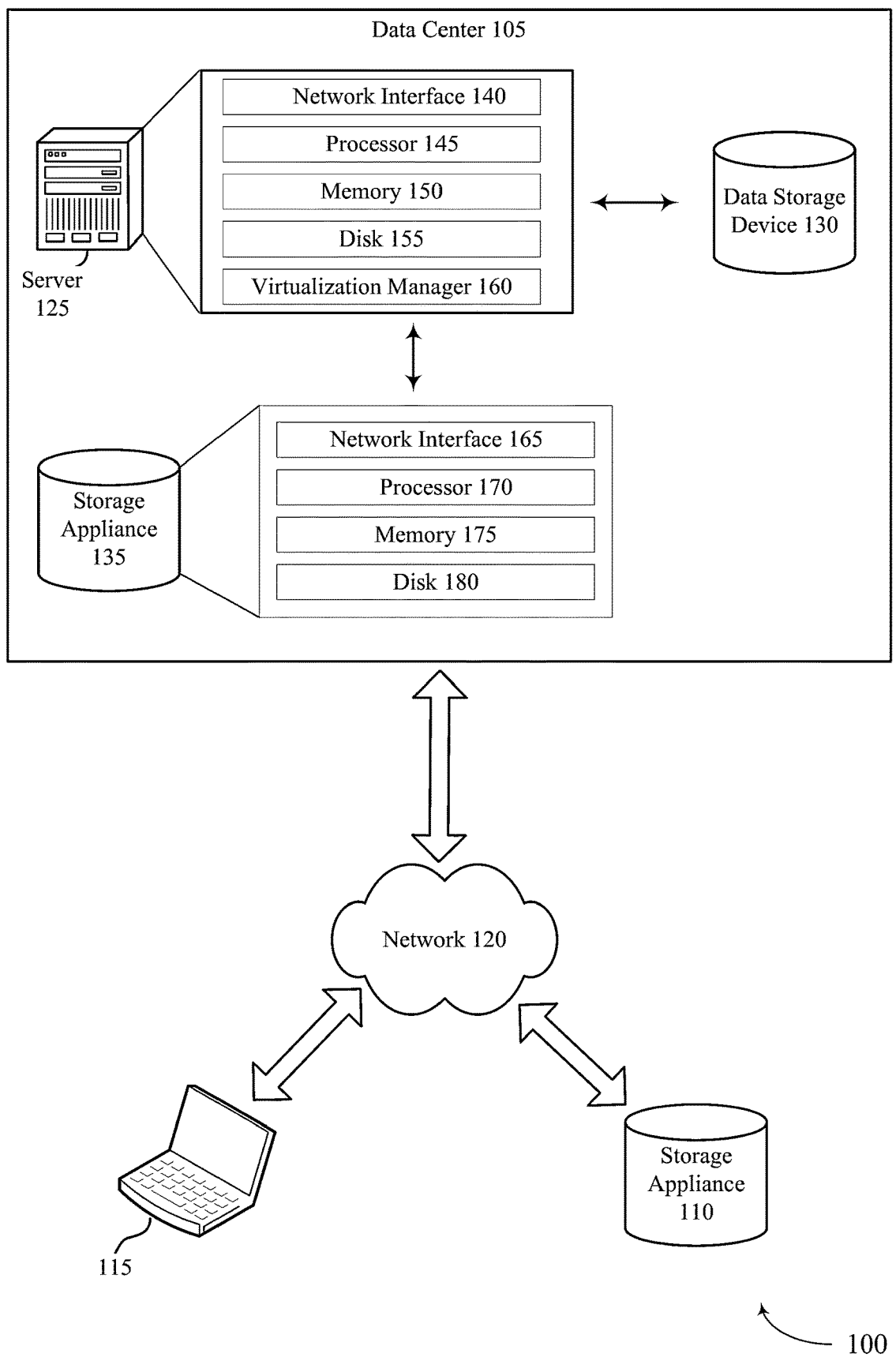
FIG. 1 illustrates an example of a computing environment that supports sensitive data discovery for databases in accordance with aspects of the present disclosure.

Databases may store relatively large quantities of data, including structured data. Structured data may be data is readable by a compatible database engine (e.g., a structured query language (SQL) database engine), and may not be readable other than by (e.g., without use of) the database engine. Interpreting the contents of structured data within a database thus may require reading the data using the database engine for the database. This may create technical or other challenges with respect to identifying sensitive data as included in the structured data within a database. As used herein, sensitive data may be any type of data that is targeted for location identification, classification, or both. Examples of sensitive data may include personally identifiable information (PII), information subject to the Health Insurance Portability and Accountability Act (HIPAA), information subject to the General Data Protection Regulation (GPDR), information subject to the California Consumer Privacy Act (CCPA), or any other type of data located in the database that may be of particular interest for one or more reasons. For example, reading and analyzing the structured data may be resource-intensive in terms of time resources, processing resources, or other resources, and in some cases, accessing the structured data may require an elevated level of access (e.g., security privilege, administrative privilege), and each additional entity (e.g., application, human user) to which such access is provided may pose additional security vulnerability for the database.

As described herein, a system may utilize database metadata to effectively identify and determine different types of data within the database (including structured data), without accessing (e.g., reading) or analyzing the data itself. For example, the system may identify the different types of data non-invasively based on associated metadata, rather than the data itself). A data management system may perform a metadata scan or query procedure to obtain metadata associated with the database (e.g., database name, schema, table names, column names, data types for tables or columns, data sizes, or other metadata associated with the structured data stored in the database). For example, the data management system may transmit a request to a database management system (which may directly manage the database and in some cases include the database engine for the database), and the database management system provide the requested metadata associated with the database to the data management system.

The data management system may analyze (e.g., perform pattern matching or another form of analysis) the metadata against a set of metadata rules or patterns associated with a data type (e.g., a target data type for location or classification purposes, which may in some cases be referred to as sensitive data). For example, the rules or patterns may be user-defined data compliance and policy definitions, or may be pre-defined definitions characteristic the type of data. The received database metadata may be compared against the set of rules or patterns associated with associated known rules or patterns of metadata for a data type that is targeted for identification within the database. For example, a column name or other metadata attribute may include a pattern of characters that is indicative of a sensitive data type (e.g., phone number pattern, social security number pattern, address pattern, among other examples). As one such example, the pattern "SSN," if included in the metadata for a column or table, may be indicative that the structured data within that column or table includes one or more social security numbers. As other such examples, the pattern "user" may be indicative of a type of sensitive data associated with user credentials, the patterns "address," "city," "state," and "country" may be indicative of a type of sensitive data associated with address information, the patterns "firstname" and "lastname" may be indicative of a type of sensitive data associated with name information, and so on. It is to be understood that these and any other example patterns described herein are non-exhaustive and are provided solely for the sake of illustration, and that other patterns may be used. Thus the data management system may be able to determine different possible data types at different locations based on the identified patterns.

The data management system may identify locations for data of a given type such as locations of one or more sensitive types of data based on the pattern matching of the received database metadata against the stored patterns, which may be associated with one or more data types. The classification results of the pattern matching procedure may then be output so that a privileged user may review, approve, or deny the classification results. In some cases, the identification of locations of sensitive data may allow the user to determine what kinds of data may be impacted by a ransomware attack or other malicious activity, and may provide enhanced visibility of which data (or locations of data) are to be attended to in the case of an adverse event to prevent the further spread of malware or to reduce the impact of the attack. Further, in some examples, the knowledge of locations of the certain types of sensitive data may increase the accuracy or granularity by which structured data may be restored within the database, or may prevent the undesired restoration of sensitive data from a prior backup.

Aspects of the disclosure are initially described in the context of an environment supporting an on-demand database service. Aspects of the disclosure are further illustrated by and described with reference to apparatus diagrams, system diagrams, data discovery flow diagrams, a process flow, and flowcharts that relate to sensitive data discovery for databases.

FIG. 1 illustrates an example of a computing environment 100 for cloud computing that supports techniques for package injection for virtual machine configuration in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure, one or more databases (e.g., the server 125 may include a database management system for a database), or any combination thereof.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, the data storage device 130 may store structured data as part of a database (e.g., a database for which the server 125 implements a database management system) In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks. Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, networked computing environment 100 may provide remote access to secure applications and files stored within data center 105 from a remote computing device, such as computing device 115. In addition, the storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

A database (e.g., as implemented and managed at a data storage device 130, a server 125, or any combination thereof) may store relatively large quantities of data, including some kinds of structured data for which identification (e.g., identification of the locations thereof) may be desired. A database management system (e.g., located at a server 125), may perform a metadata scan or query procedure on the database to obtain metadata associated with the database (e.g., database name, schema, table names, column names, data types for tables or columns, data sizes, or other metadata associated with the structured data stored in the database), potentially in response to a request from a data management system (e.g., located at the storage appliance 135, the storage appliance 110, or any combination thereof). After performing the metadata query procedure, the database management system may then transmit the database metadata to the data management system. The data management system may compare the received metadata against one or more sets of rules or patterns associated with one or more data types that are targeted for identification (e.g. location) within the database. In such cases, the data management system may be able to identify, for each targeted data type, one or more locations (e.g., columns, tables) within the database that include data of the targeted data type.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
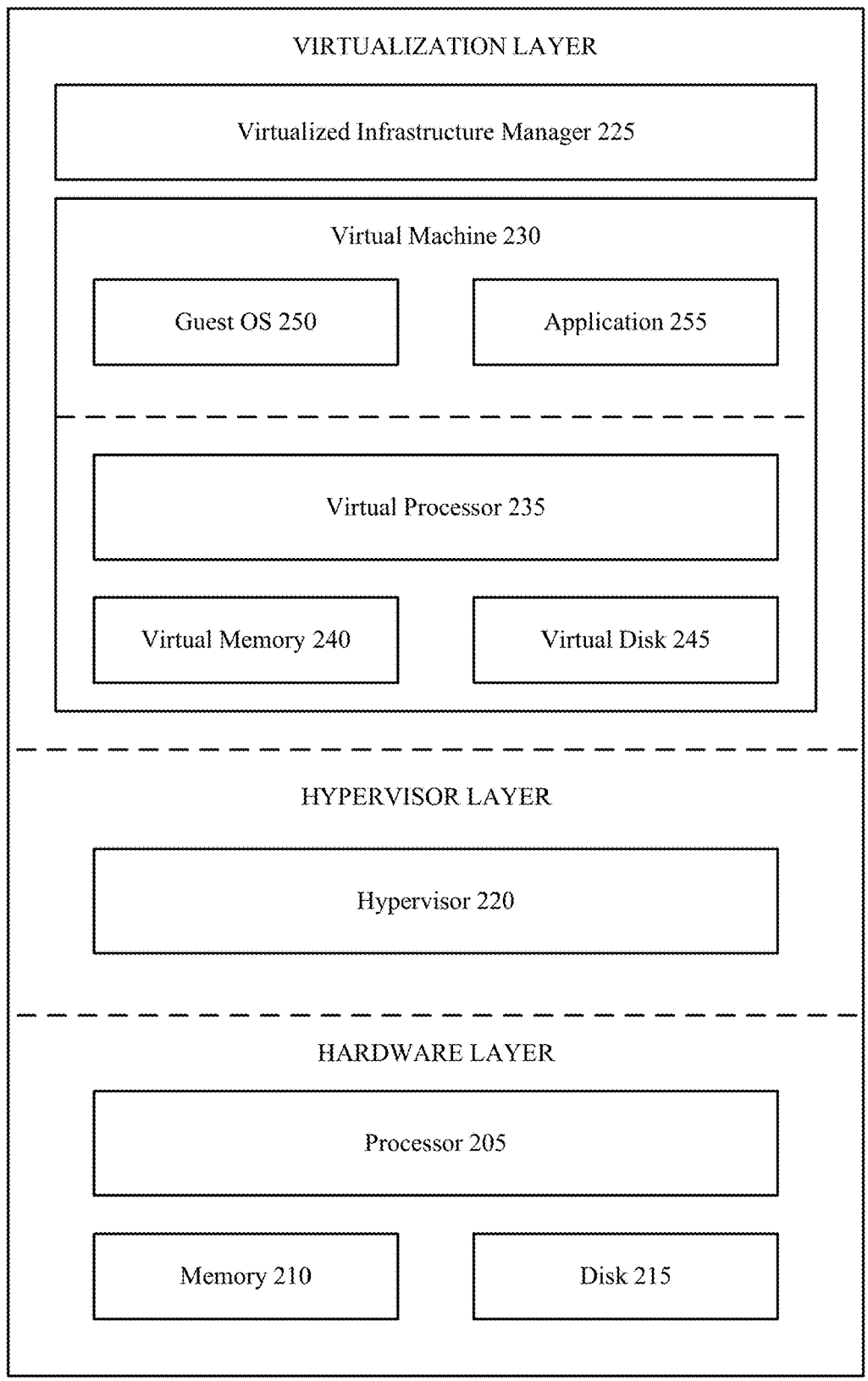
FIG. 2 illustrates an example of a server that supports sensitive data discovery for databases in accordance with aspects of the present disclosure.

FIG. 2 illustrates an example of a server 200 that supports techniques for data retrieval using cryptographic signatures in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more virtual disks 245. In one example, a virtual machine 230 may include a plurality of virtual disks 245, with each virtual disk of the plurality of virtual disks 245 associated with a different file stored on the one or more virtual disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, in some cases, the server 200 may support sensitive data discovery for databases. For example, the server 200 (e.g., one or more virtual machines implemented thereby) may serve as a database management system as described herein.

Figure 3:
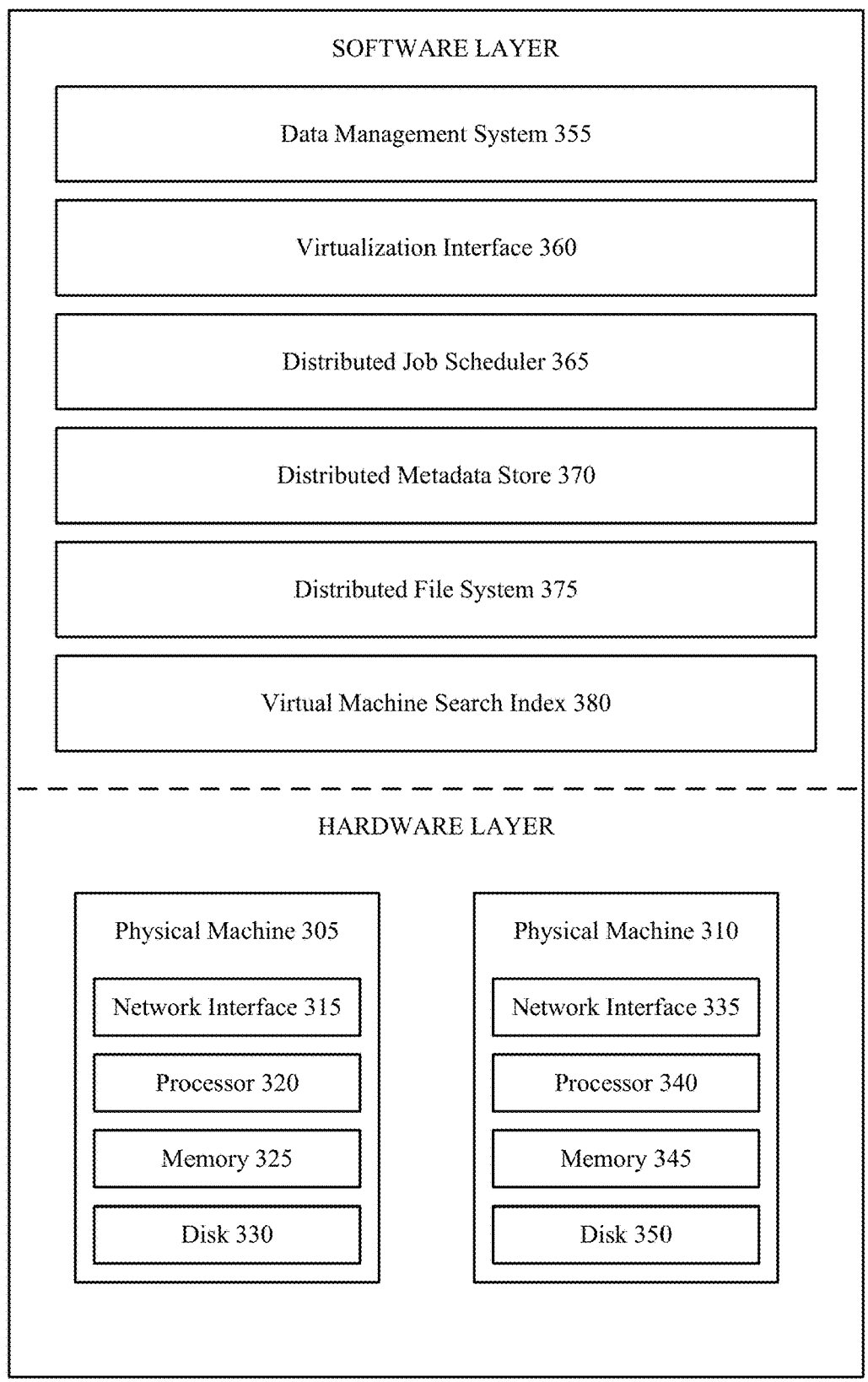
FIG. 3 illustrates an example of a storage appliance that supports sensitive data discovery for databases in accordance with aspects of the present disclosure.

FIG. 3 illustrates an example of a storage appliance 300 that supports techniques for data retrieval using cryptographic signatures in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPU, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/sl/sl.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300 or server 200 may support sensitive data discovery for databases. For example, the server 200 (e.g., one or more virtual machines implemented thereby) may implement a database management system as described herein, and the storage appliance 300 may implement a data management system (e.g., a data management system 355) as described herein.

Figure 4:
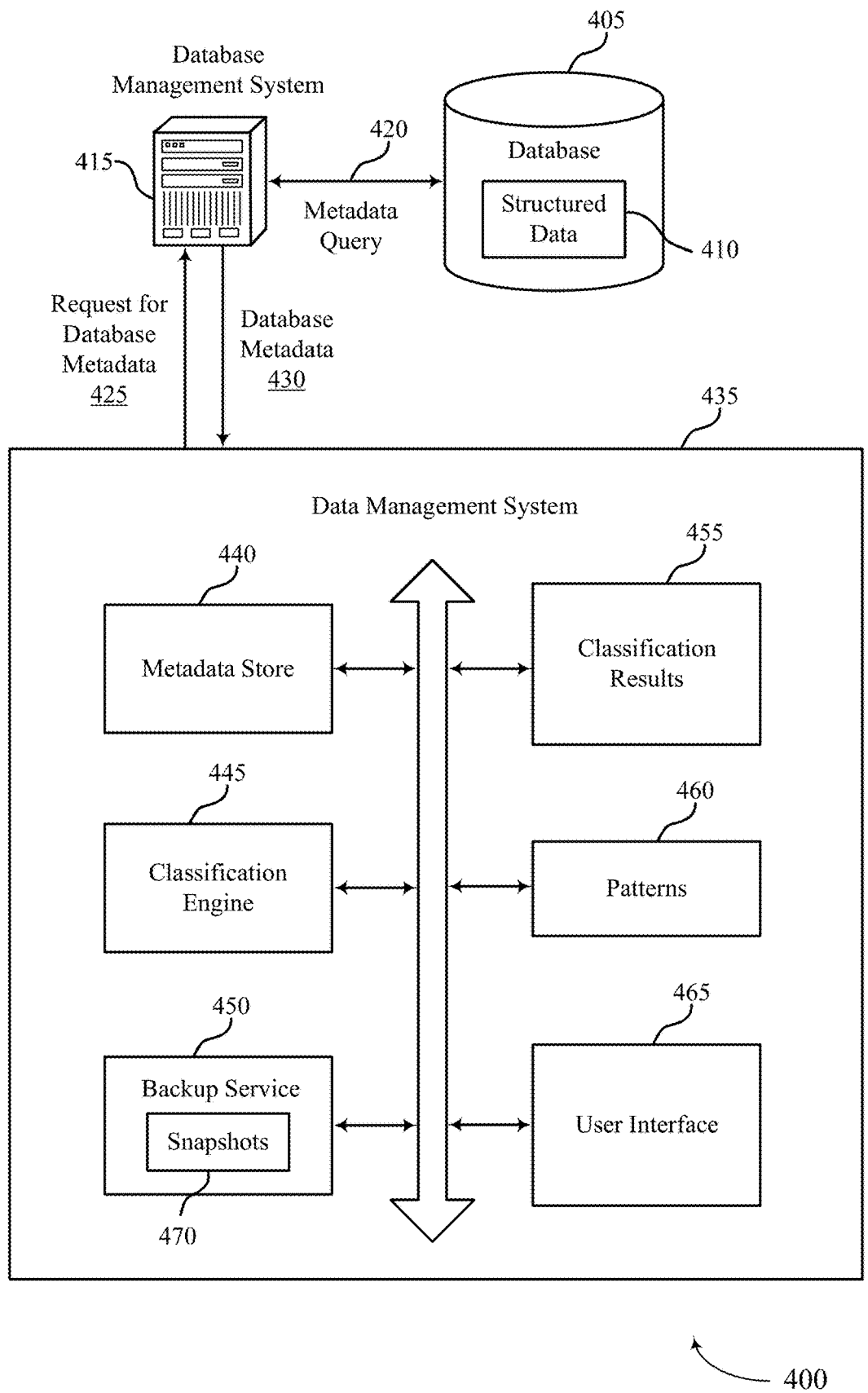
FIG. 4 illustrates an example of a data discovery flow diagram that supports sensitive data discovery for databases in accordance with aspects of the present disclosure.

FIG. 4 illustrates an example of a data discovery flow diagram 400 that supports sensitive data discovery for databases in accordance with aspects of the present disclosure. In some examples, various features of the data discovery flow diagram 400 may be implemented at or by a server 125, storage appliance 135, computing device 115, server 200, storage appliance 300, or any combination thereof as described with respect to FIGS. 1 through 3.

Databases such as database 405 may store large quantities of data, which may be structured data 410. Identifying sensitive data within the structured data 410 based on reading and analyzing the structured data 410 itself may have various drawbacks. For example, reading and analyzing the structured data 410 itself may be resource-intensive in terms of time resources, processing resources, or other resources. Additionally or alternatively, reading and analyzing the structured data 410 itself may involve an elevated level of access (e.g., security privilege, administrative privilege), and each additional entity (e.g., application, human user) to which such access is provided may represent an additional security vulnerability for the database 405. As used herein, sensitive data may be any type of data that is targeted for location identification, classification, or both—e.g., PII, HIPAA information, information subject to the GDPR, information subject to the CCPA, or any other type of data that may be of particular interest for one or more reasons.

In some examples, a system may employ techniques which utilize database metadata to effectively identify and determine different types of data within the database 405, including for the structured data 410 within the database 405, without accessing (e.g., reading) or analyzing the data itself. A data management system 435 may transmit a request 425 for database metadata to the database management system 415. The database management system 415 may then perform a metadata scan or query procedure 420 on the database 405 to obtain metadata associated with the database 405, including metadata associated with files and objects of the database 405. Such metadata attributes may include database name, schema, table names, column names, data types for tables or columns, data sizes, or other metadata associated with the structured data stored in the database. The metadata scan or query procedure 420 may also identify other metadata such as metadata about host for the database 405 (e.g., about one or more host servers), instance, system, and database types to be used for integration into backup and recovery processes. In addition, in some cases the metadata scan or query procedure 420 may be periodic such that the database management system 415 periodically transmits metadata information to the data management system 435 for change analysis and rule matching processes. For example, the data management system 435 may periodically analyze changes in metadata or may periodically analyze or change rules or patterns determined for comparing against the metadata.

After performing the metadata query procedure 420 (e.g., in response to the request 425 from the data management system 435), the database management system 415 may transmit the database metadata 430 to the data management system 435. The data management system 435 may store the received database metadata 430 in a metadata store 440 at the data management system 435. The metadata store 440 may, for example, be a data lake (e.g., a data repository that stores the received database metadata 430 in its as-received format, which may support related analysis by the classification engine 445, among other possible advantages).

The data management system 435 may also include a classification engine 445 and a set of patterns 460 which may allow the data management system 435 to analyze the metadata using a set of rules or patterns 460 associated with a data type. The patterns 460 may be user-defined data compliance and policy definitions, or may be pre-defined definitions characteristic of the structured data within the database 405. For example, the received database metadata 430 may be compared against the set of rules or patterns 460 associated with associated known rules or patterns of metadata for a data type that is targeted for identification within the database 405. In some implementations, for example, if a column name includes the pattern "SSN," the column may be identified as including social security numbers and thus may be classified as a type of sensitive data by the classification engine 445. Hence, "SSN" may be an example of a pattern that may be included in the patterns 460, potentially along with any number of other patterns. In another example, a column name or other metadata may include a pattern of numbers characteristic of sensitive data type such as a phone number pattern, and address pattern, or other kind of numerical pattern characteristic of a potential sensitive data field. The patterns 460 may include any quantity of sets of patterns, where different sets of patterns may be associated with different data types.

The data management system 435 may obtain classification results 455 based on the pattern matching procedure, which may include the identified locations for data of a given type (e.g., which columns of which tables include a type of sensitive data based on the pattern matching of the received database metadata 430 against the patterns 460). The classification results 455 may be provided (e.g., displayed), and a privileged user may then review the classification results 455 via a user interface 465. In some examples, the classification results 455 may allow the privileged user to see whether the type of data targeted for classification (e.g., the type of data associated with the operative patterns 460) has been identified as being included in the database 405, the locations within the database 405 identified as including such data, or both.

Such classification results 455 may support a user of the data management system 435 identifying what type of data may have been impacted by an adverse event experienced by the database 405. For example, if the database 405 or a portion thereof is impacted by a ransomware attack or other malicious activity, the user may be able to identify whether any sensitive data was impacted based on the classification results 455 (e.g., based on any overlap between the impacted portion of the database and the locations of sensitive data indicated by the classification results 455). Thus, the user may have enhanced visibility of which data (or locations of data) are to be attended to in the case of an adverse event to prevent the further spread of malware or to reduce the impact of the attack. Further, in some examples, the data management system 435 may transmit a request 425 for database metadata to initiate a metadata scan and related classification procedure in response to an indication of an adverse event (e.g., malware attack or natural disaster) impacting the database 405, or the data management system 435 may initiate a classification procedure by the classification engine 445 on metadata previously stored to the metadata store 440 in response to such an indication.

Additionally or alternatively, a privileged user of the database 405 (e.g., a database administrator, business owner, data owner, or other privileged user interested in the data) may be able to review, approve (e.g., confirm), deny (e.g., reject), or change (e.g., correct or otherwise update) the classification results 455 as applicable. For example, the privileged user may have the ability to instruct the database management system to directly query the data 410 within the database in order to test (e.g., verify) the accuracy of the classification results 455 (e.g., to see whether data stored at a given location really is the type of data indicated by the classification results 455). The privileged user may be able to modify the classification results 455 as stored by the data management system 435 to correct any inaccuracy that may exist in the classification results 455 as initially generated by the classification engine 445 (e.g., if the classification results 455 initially identify a column or table as storing sensitive data, but the privileged user determines the column or table does not in fact store sensitive data, the privileged user may modify the stored classification results 455 accordingly so that, when later consulted, the classification result are completely accurate). Additionally or alternatively, the privileged user may be able to alter the patterns 460 to remedy any false positives or false negatives included in a set of classification results 455 (e.g., such that a subsequent metadata scan and related classification procedure may avoid such false positives or false negatives).

In some examples, the data management system 435 may further include a backup service 450 which may store one or more snapshots 470 of a state of the data management system 435 based on determining that one or more locations within the database 405 include structured data that includes sensitive data. In some examples, the data management system 435 may receive a request to restore at least a portion of the structured data 410 within the database 405, and may restore the data 410 based on the previous snapshot.

In some implementations, the processes performed by the data management system 435 may facilitate the "right to forget" policies and supporting compliance with GDPR, CCPA, or other privacy regulations based on identifying all locations of sensitive data within a database. For example, the locations of certain types of sensitive data may be more efficiently identified within the database 405 in cases that the data is to be deleted to comply with a deletion request from the owner of the sensitive data. Further, having knowledge of the location of sensitive data may prevent the undesired restoration of sensitive data from a prior snapshot 470 during a database recovery operation. For example, the data management system 435 may receive a request to restore a version of the database 405 based on a previously obtained snapshot 470 thereof, and the data management system 435 may use previously obtained classification results 455 corresponding to the snapshot 470 to identify aspects of the snapshot corresponding to locations of sensitive data or data flagged for deletion, and the data management system 435 may mask (e.g., scramble or refrain from restoring) the data in such locations. Thus, certain data fields that contain data flagged for deletion may be masked in connection with a snapshot recovery to reduce the likelihood that such data is restored in a restoration procedure performed by backup service 450. In some other examples, the knowledge of the type and location of certain kinds of data within database 405 may and further support remedial and mitigation measures following an adverse event (e.g., a ransomware or other malware attack).

Figure 5:
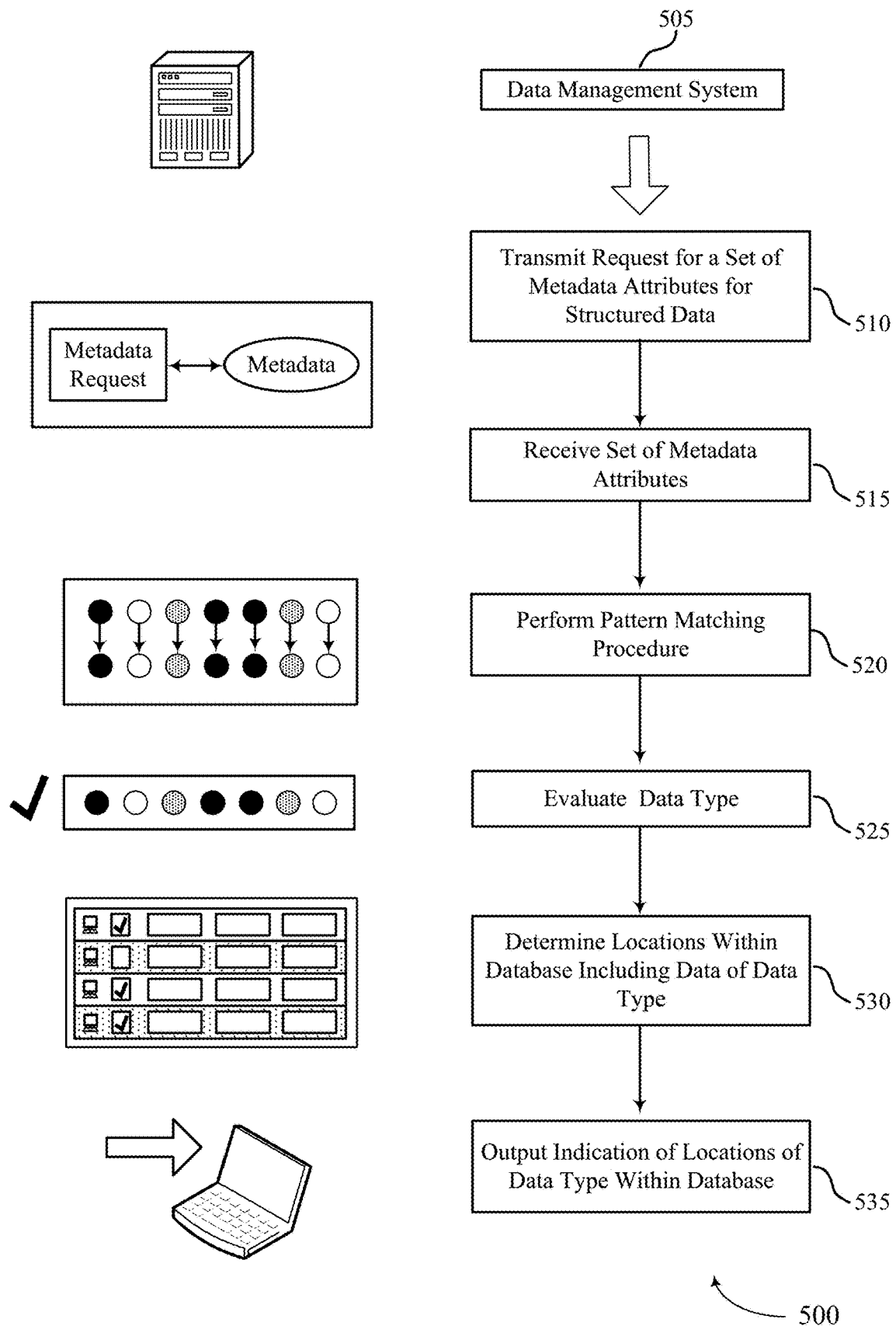
FIG. 5 illustrates an example of a process flow that supports sensitive data discovery for databases in accordance with aspects of the present disclosure.

FIG. 5 illustrates an example of a process flow 500 that supports sensitive data discovery for databases in accordance with aspects of the present disclosure. In some examples, various features of the process flow 500 may be implemented at or by a server 125, storage appliance 135, computing device 115, server 200, storage appliance 300, or any combination thereof as described with respect to FIGS. 1 through 3.

The process flow 500 may describe processed performed at or by a data management system 435, which may be an example of the data management system 505 described with reference to FIG. 4. At 510, the data management system 505 may transmit a request to a database management system for a database to provide a set of metadata attributes for structured data within the database.

At 515, the data management system 505 may receive the set of metadata attributes in response to transmitting the request. For example, the metadata attributes may include information that indicates a name of the database, a schema of the database, names of tables within the database, names of table columns within the database, data types within the database, or quantities of data stored at locations within the database, or any combination thereof. In some examples, the data management system 505 may store the set of metadata attributes (e.g., within a database definition file for the database), and the stored set of metadata attributes may be evaluated against the one or more patterns during a pattern matching procedure. In some examples, the request that the database management system provide the set of metadata attributes may be based on a backup schedule for the database.

At 520, the data management system 505 may perform a pattern matching procedure to evaluate the set of metadata attributes for the structured data within the database against one or more patterns associated with a data type. In some cases, the data management system 435 may receive one or more inputs (e.g., user inputs) that indicate the one or more patterns associated with the data type via a user interface or via a user input. In some examples, the pattern matching procedure may include comparing the set of metadata attributes to the one or more patterns associated with the data type, in which the set of metadata attributes are associated with respective locations within the database. The pattern matching procedure may further determine (e.g., based on a match between at least a portion of a metadata attribute within the set of metadata attributes and a pattern of the one or more patterns) that a location associated with the metadata attribute includes structured data of the data type.

At 525, the data management system 505 may evaluate the data type of the structured data by determining one or more possible data types for the structured data based on the pattern matching procedure. In some examples, the data type may include personal identity information, personal financial information, personal medical information, personal biometric information, personal location information, or any combination thereof.

At 530, the data management system 505 may determine, based on the pattern matching procedure, that one or more locations within the database include structured data of the determined data type.

At 535, the data management system 505 may output an indication that one or more locations within the database include structured data of the data type (e.g., may indicate that structured data of the data type exists at least somewhere within the database). In some examples, the indication may additionally or alternatively indicate the one or more locations which include the structured data of the determined data type (e.g., may indicate which particular locations within the database have been identified as including structured data of the data type). In some cases, the data management system 435 505 may receive (e.g., from a privileged user; after outputting the indication that the one or more locations within the database comprise structured data of the data type), an indication that a location of the indicated one or more locations does not store structured data of the data type—the data management system 505 505 may modify corresponding classification results accordingly.

In some implementations, the data management system 505 may receive an indication that structured data of the data type is to be removed from the database, where transmitting the request that the database management system provide the set of metadata attributes, or outputting the indication that the one or more locations within the database includes structured data of the data type, or both, is in response to the indication that structured data of the data type is to be removed from the database.

In some other implementations, the data management system 505 may identify an adverse event for the database (e.g., a malware or ransomware attack or some other security threat). In such implementations, transmitting the request that the database management system provide the set of metadata attributes, or outputting the indication that the one or more locations within the database include structured data of the data type, or both, is in response to the indication that structured data of the data type is to be removed from the database.

In some other implementations, the data management system 505 may store a snapshot of the database and may also store information indicating that the one or more locations within the database include structured data of the data type as of a time of the snapshot. In some such implementations, the data management system 505 may receive a request to restore the database based on the snapshot, and may mask data associated with the one or more locations within the database based on the information indicating that the one or more locations within the database include structured data of the data type as of the time of the snapshot. In some examples, the data masking may include scrambling or refraining from restoring the data associated with the one or more locations.

Figure 6:
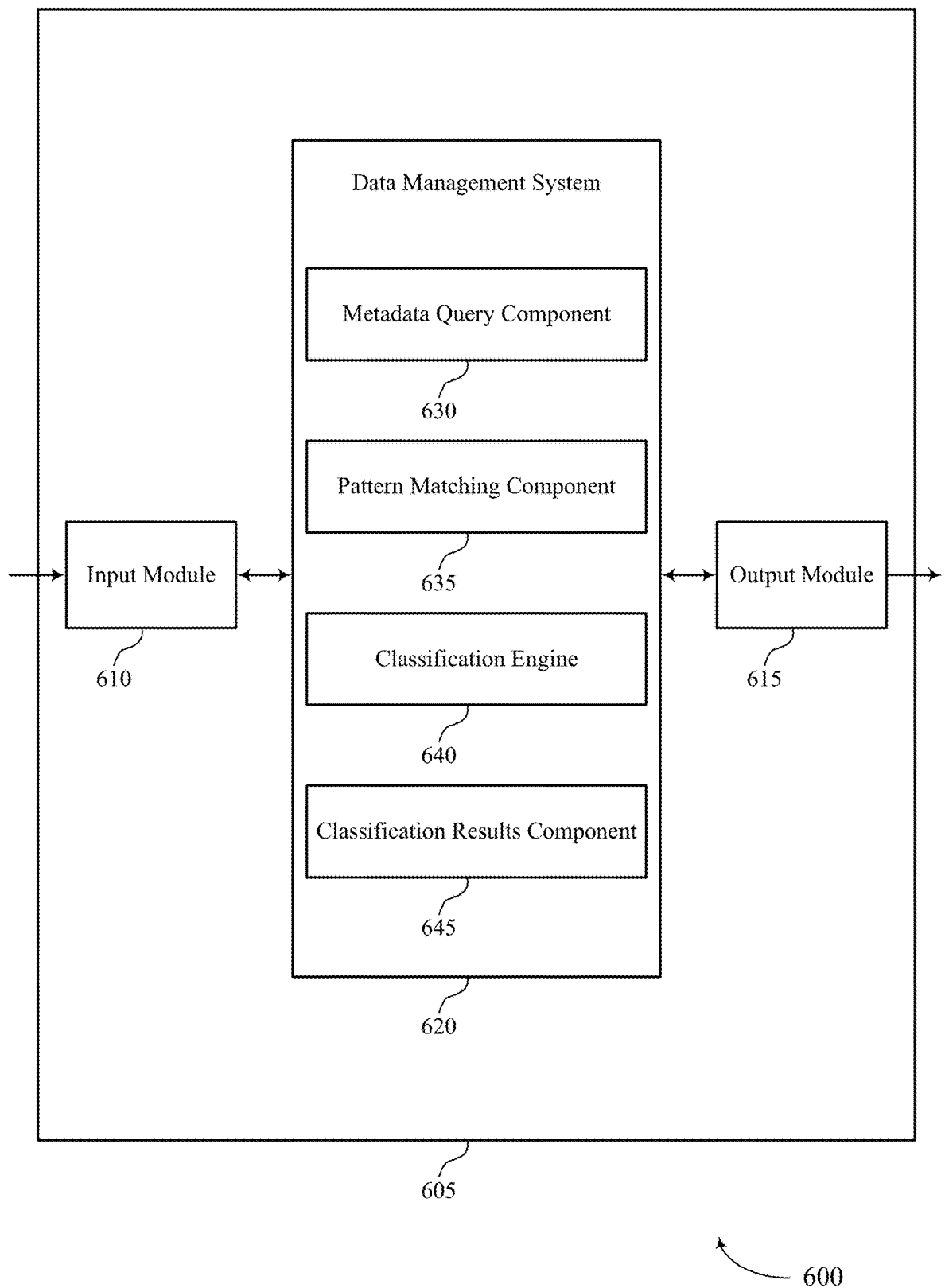
FIG. 6 shows a block diagram of an apparatus that supports sensitive data discovery for databases in accordance with aspects of the present disclosure.

FIG. 6 shows a block diagram 600 of a device 605 that supports sensitive data discovery for databases in accordance with aspects of the present disclosure. The device 605 may include an input module 610, an output module 615, and a data management system 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the data management system 620 to support sensitive data discovery for databases. In some cases, the input module 610 may be a component of a network interface 810 as described with reference to FIG. 8.

The output module 615 may manage output signals for the device 605. For example, the output module 615 may receive signals from other components of the device 605, such as the data management system 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of a network interface 810 as described with reference to FIG. 8.

For example, the data management system 620 may include a metadata query component 630, a pattern matching component 635, a classification engine 640, a classification results component 645, or any combination thereof. In some examples, the data management system 620, or various components thereof, may be configured to perform various operations (e.g., receiving, monitoring, transmitting) using or otherwise in cooperation with the input module 610, the output module 615, or both. For example, the data management system 620 may receive information from the input module 610, send information to the output module 615, or be integrated in combination with the input module 610, the output module 615, or both to receive information, transmit information, or perform various other operations as described herein.

The data management system 620 may support database management in accordance with examples as disclosed herein. The metadata query component 630 may be configured as or otherwise support a means for transmitting, by a data management system, a request that a database management system for a database provide a set of metadata attributes for structured data within the database. The metadata query component 630 may be configured as or otherwise support a means for receiving, at the data management system based on transmitting the request, the set of metadata attributes for the structured data within the database. The pattern matching component 635 may be configured as or otherwise support a means for performing, by the data management system, a pattern matching procedure to evaluate the set of metadata attributes for the structured data within the database against one or more patterns associated with a data type. The classification engine 640 may be configured as or otherwise support a means for determining, by the data management system and based on the pattern matching procedure, that one or more locations within the database include structured data of the data type. The classification results component 645 may be configured as or otherwise support a means for outputting, by the data management system, an indication that the one or more locations within the database include structured data of the data type.

Figure 7:
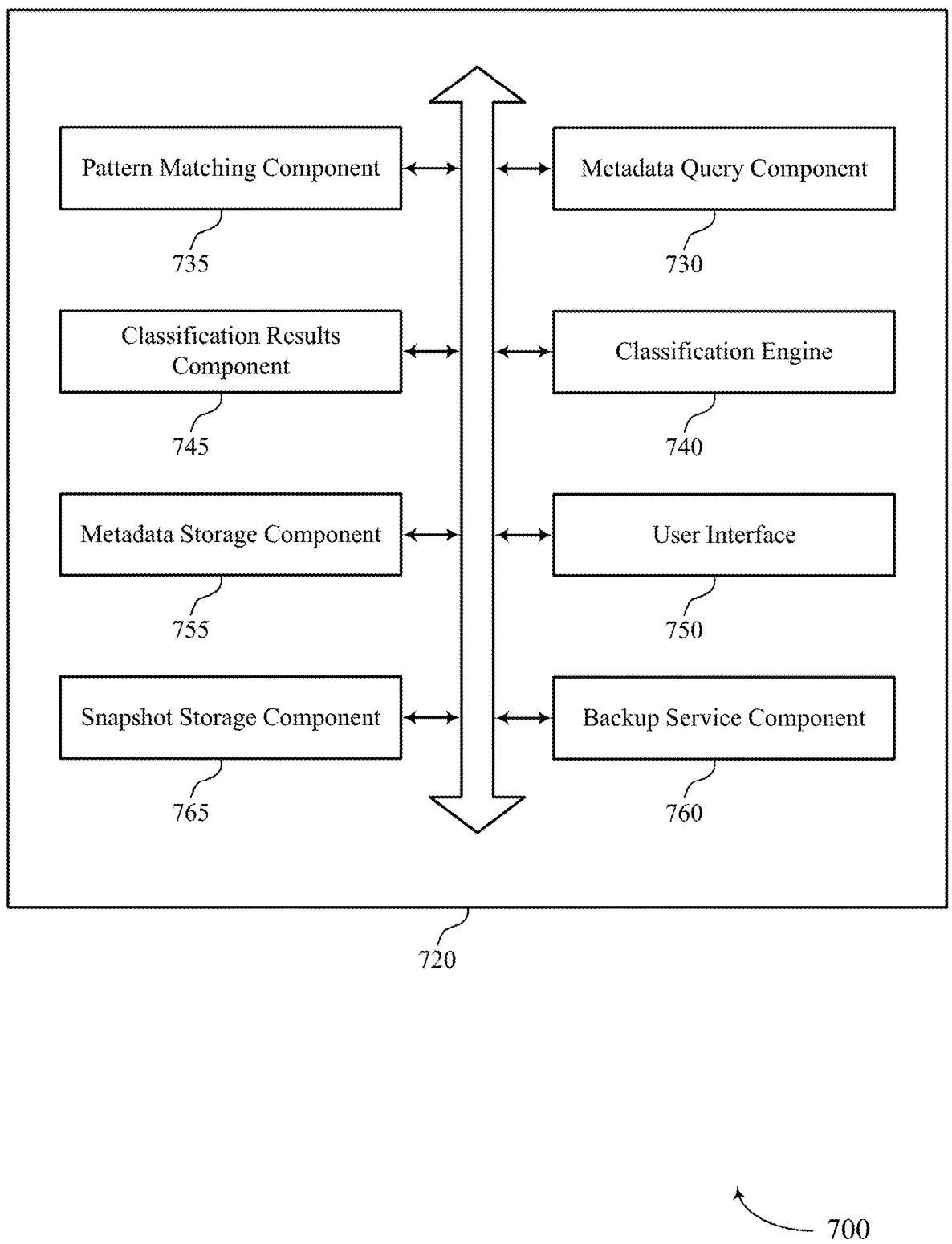
FIG. 7 shows a block diagram of a data management system that supports sensitive data discovery for databases in accordance with aspects of the present disclosure.

FIG. 7 shows a block diagram 700 of a data management system 720 that supports sensitive data discovery for databases in accordance with aspects of the present disclosure. The data management system 720 may be an example of aspects of a data management system or a data management system 620, or both, as described herein. The data management system 720, or various components thereof, may be an example of means for performing various aspects of sensitive data discovery for databases as described herein. For example, the data management system 720 may include a metadata query component 730, a pattern matching component 735, a classification engine 740, a classification results component 745, a user interface 750, a metadata storage component 755, a backup service component 760, a snapshot storage component 765, or any combination thereof. Each of these components may communicate, directly or indirectly, with one another (e.g., via one or more buses).

The data management system 720 may support database management in accordance with examples as disclosed herein. The metadata query component 730 may be configured as or otherwise support a means for transmitting, by a data management system, a request that a database management system for a database provide a set of metadata attributes for structured data within the database. The metadata query component 730 may be configured as or otherwise support a means for receiving, at the data management system based on transmitting the request, the set of metadata attributes for the structured data within the database. The pattern matching component 735 may be configured as or otherwise support a means for performing, by the data management system, a pattern matching procedure to evaluate the set of metadata attributes for the structured data within the database against one or more patterns associated with a data type. The classification engine 740 may be configured as or otherwise support a means for determining, by the data management system and based on the pattern matching procedure, that one or more locations within the database include structured data of the data type. The classification results component 745 may be configured as or otherwise support a means for outputting, by the data management system, an indication that the one or more locations within the database include structured data of the data type.

In some examples, the classification engine 740 may be configured as or otherwise support a means for determining, based on the pattern matching procedure, the one or more locations within the database that include structured data of the data type, where the indication indicates the one or more locations.

In some examples, to support performing the pattern matching procedure, the classification engine 740 may be configured as or otherwise support a means for comparing the set of metadata attributes to the one or more patterns associated with the data type, where the set of metadata attributes includes metadata attributes associated with respective locations within the database. In some examples, to support performing the pattern matching procedure, the classification results component 745 may be configured as or otherwise support a means for determining, based on a match between at least a portion of a metadata attribute within the set of metadata attributes and a pattern of the one or more patterns, that a location associated with the metadata attribute includes structured data of the data type.

In some examples, the user interface 750 may be configured as or otherwise support a means for receiving, via a user interface for the data management system, one or more inputs that indicate the one or more patterns associated with the data type.

In some examples, to support receiving the set of metadata attributes, the classification results component 745 may be configured as or otherwise support a means for receiving information that indicates a name of the database, a schema of the database, names of tables within the database, names of table columns within the database, data types within the database, or quantities of data stored at locations within the database, or any combination thereof.

In some examples, the metadata storage component 755 may be configured as or otherwise support a means for storing the set of metadata attributes (e.g., within a database definition file) at the data management system, where the pattern matching procedure includes evaluating the stored set of metadata attributes against the one or more patterns (e.g., after some passage of time since the request that the database management system for the database provide the set of metadata attributes, such as in response a request received at the data management system to perform the pattern matching procedure, potentially after one or more prior pattern matching procedure have been performed on the same set of metadata attributes).

In some examples, the classification results component 745 may be configured as or otherwise support a means for receiving, after outputting the indication that the one or more locations within the database include structured data of the data type, an indication that a location of the one or more locations does not store structured data of the data type.

In some examples, the classification engine 740 may be configured as or otherwise support a means for receiving an indication that structured data of the data type is to be removed from the database, where transmitting the request that the database management system provide the set of metadata attributes, or outputting the indication that the one or more locations within the database include structured data of the data type, or both, is in response to the indication that structured data of the data type is to be removed from the database.

In some examples, the backup service component 760 may be configured as or otherwise support a means for identifying an adverse event for the database, where transmitting the request that the database management system provide the set of metadata attributes, or outputting the indication that the one or more locations within the database include structured data of the data type, or both, is in response to the indication that structured data of the data type is to be removed from the database.

In some examples, the snapshot storage component 765 may be configured as or otherwise support a means for storing, at the data management system, a snapshot of the database. In some examples, the backup service component 760 may be configured as or otherwise support a means for storing, at the data management system based on determining that the one or more locations within the database include structured data of the data type, information indicating that the one or more locations within the database include structured data of the data type as of a time of the snapshot.

In some examples, the backup service component 760 may be configured as or otherwise support a means for receiving a request to restore the database based on the snapshot. In some examples, the backup service component 760 may be configured as or otherwise support a means for masking, in response to the request to restore the database, data associated with the one or more locations within the database based on the information indicating that the one or more locations within the database include structured data of the data type as of the time of the snapshot.

In some examples, to support masking the data associated with the one or more locations, the backup service component 760 may be configured as or otherwise support a means for scrambling or refraining from restoring the data associated with the one or more locations.

In some examples, the metadata query component 730 may be configured as or otherwise support a means for transmitting the request that the database management system provide the set of metadata attributes is based on backup schedule for the database.

In some examples, to support data type, the metadata storage component 755 may be configured as or otherwise support a means for personal identity information, personal financial information, personal medical information, personal biometric information, personal location information, or any combination thereof.

Figure 8:
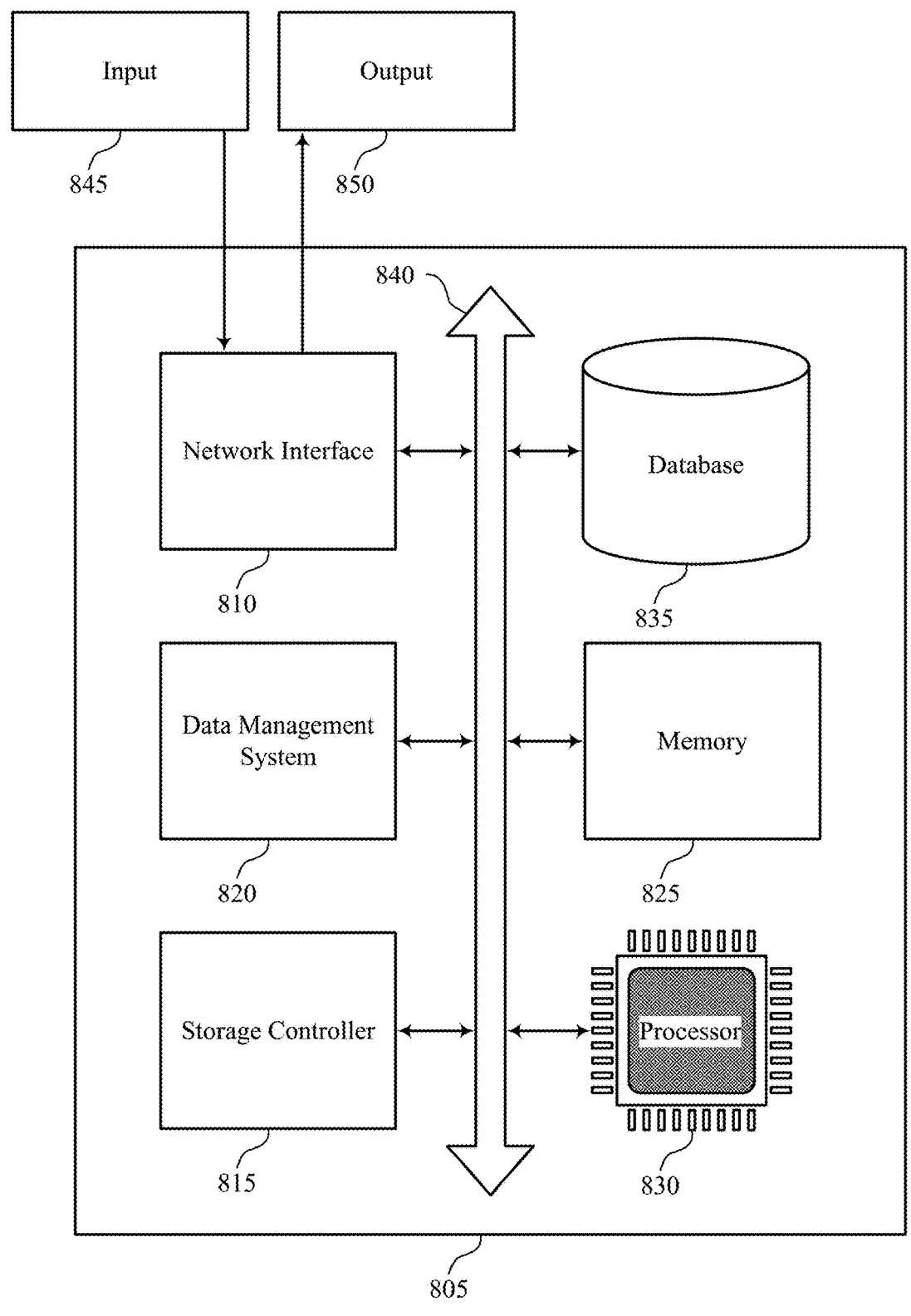
FIG. 8 shows a diagram of a system including a device that supports sensitive data discovery for databases in accordance with aspects of the present disclosure.

FIG. 8 shows a diagram of a system 800 including a device 805 that supports sensitive data discovery for databases in accordance with aspects of the present disclosure. The device 805 may be an example of or include the components of a device 605 as described herein. The device 805 may include components for bi-directional data communications including components for transmitting and receiving communications, such as a data management system 820, a network interface 810, a storage controller 815, a memory 825, a processor 830, and a database 835. These components may be in electronic communication or otherwise coupled (e.g., operatively, communicatively, functionally, electronically, electrically) via one or more buses (e.g., a bus 840).

The network interface 810 may manage input signals 845 and output signals 850 for the device 805. The network interface 810 may also manage peripherals not integrated into the device 805. In some cases, the network interface 810 may represent a physical connection or port to an external peripheral. In some cases, the network interface 810 may utilize an operating system such as iOS®, ANDROID®, MS-DOS®, MS-WINDOWS®, OS/2®, UNIX®, LINUX®, or another known operating system. In other cases, the network interface 810 may represent or interact with a modem, a keyboard, a mouse, a touchscreen, or a similar device. In some cases, the network interface 810 may be implemented as part of a processor 830. In some examples, a user may interact with the device 805 via the network interface 810 or via hardware components controlled by the network interface 810.

The storage controller 815 may manage data storage and processing in a database 835. In some cases, a user may interact with the storage controller 815. In other cases, the storage controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting sensitive data discovery for databases).

The data management system 820 may support database management in accordance with examples as disclosed herein. For example, the data management system 820 may be configured as or otherwise support a means for transmitting, by a data management system, a request that a database management system for a database provide a set of metadata attributes for structured data within the database. The data management system 820 may be configured as or otherwise support a means for receiving, at the data management system based on transmitting the request, the set of metadata attributes for the structured data within the database. The data management system 820 may be configured as or otherwise support a means for performing, by the data management system, a pattern matching procedure to evaluate the set of metadata attributes for the structured data within the database against one or more patterns associated with a data type. The data management system 820 may be configured as or otherwise support a means for determining, by the data management system and based on the pattern matching procedure, that one or more locations within the database include structured data of the data type. The data management system 820 may be configured as or otherwise support a means for outputting, by the data management system, an indication that the one or more locations within the database including structured data of the data type.

By including or configuring the data management system 820 in accordance with examples as described herein, the device 805 may support techniques for increased data visibility and increased efficiency for the identification of different data types within a database, reduced risk associated with support and backup of sensitive data, increased backup efficiency, reduced latency for data identification, increased compliance to certain sensitive data rules and regulations, increased security of sensitive data, among other improvements.

Figure 9:
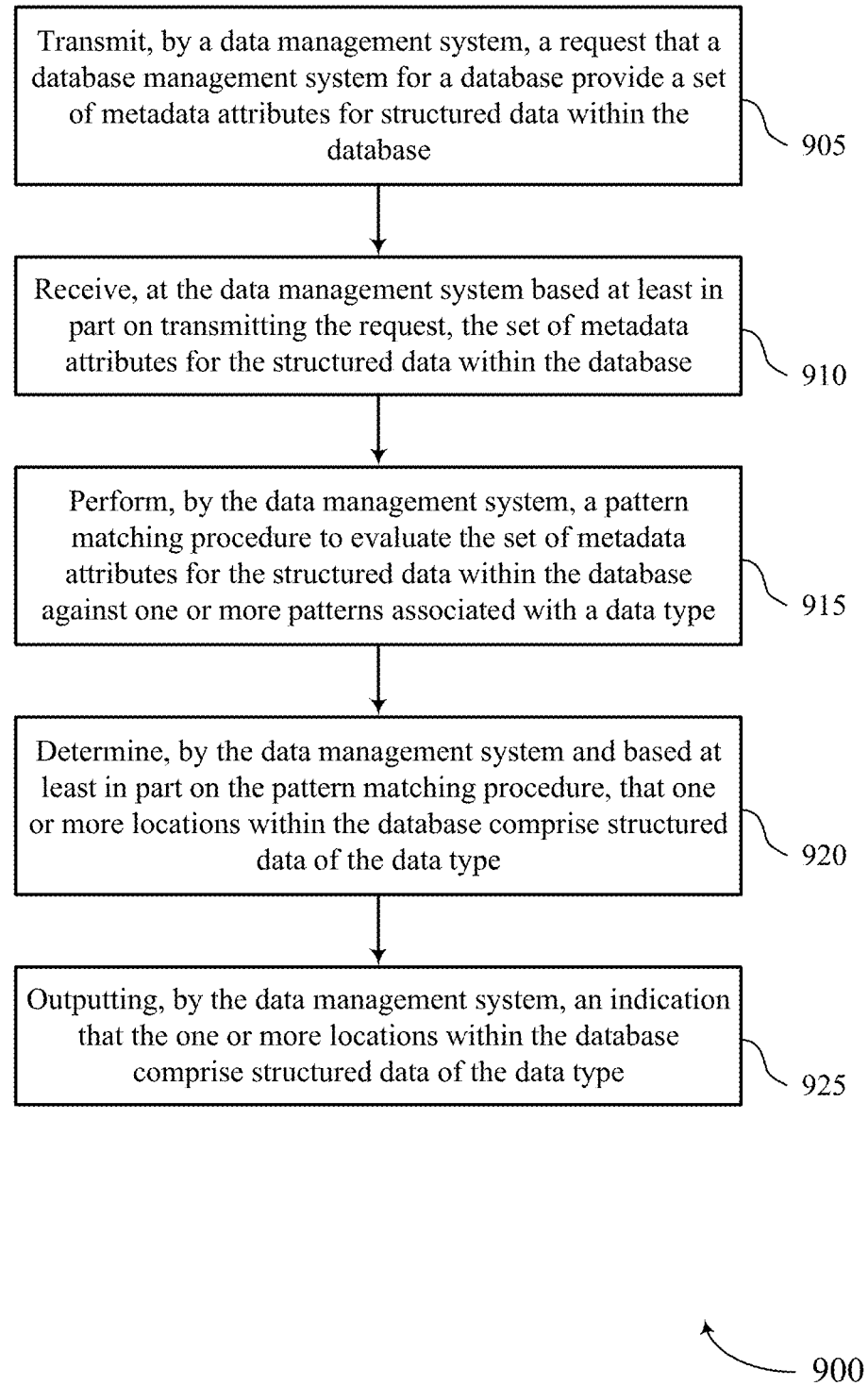
FIGS. 9 through 12 show flowcharts illustrating methods that support sensitive data discovery for databases in accordance with aspects of the present disclosure.

FIG. 9 shows a flowchart illustrating a method 900 that supports sensitive data discovery for databases in accordance with aspects of the present disclosure. The operations of the method 900 may be implemented by a Server or its components as described herein. For example, the operations of the method 900 may be performed by a Server as described with reference to FIGS. 1 through 8. In some examples, a Server may execute a set of instructions to control the functional elements of the Server to perform the described functions. Additionally, or alternatively, the Server may perform aspects of the described functions using special-purpose hardware.

At 905, the method may include transmitting, by a data management system, a request that a database management system for a database provide a set of metadata attributes for structured data within the database. The operations of 905 may be performed in accordance with examples as disclosed herein. In some examples, aspects of the operations of 905 may be performed by a metadata query component 730 as described with reference to FIG. 7.

At 910, the method may include receiving, at the data management system based on transmitting the request, the set of metadata attributes for the structured data within the database. The operations of 910 may be performed in accordance with examples as disclosed herein. In some examples, aspects of the operations of 910 may be performed by a metadata query component 730 as described with reference to FIG. 7.

At 915, the method may include performing, by the data management system, a pattern matching procedure to evaluate the set of metadata attributes for the structured data within the database against one or more patterns associated with a data type. The operations of 915 may be performed in accordance with examples as disclosed herein. In some examples, aspects of the operations of 915 may be performed by a pattern matching component 735 as described with reference to FIG. 7.

At 920, the method may include determining, by the data management system and based on the pattern matching procedure, that one or more locations within the database include structured data of the data type. The operations of 920 may be performed in accordance with examples as disclosed herein. In some examples, aspects of the operations of 920 may be performed by a classification engine 740 as described with reference to FIG. 7.

At 925, the method may include outputting, by the data management system, an indication that the one or more locations within the database include structured data of the data type. The operations of 925 may be performed in accordance with examples as disclosed herein. In some examples, aspects of the operations of 925 may be performed by a classification results component 745 as described with reference to FIG. 7.

Figure 10:
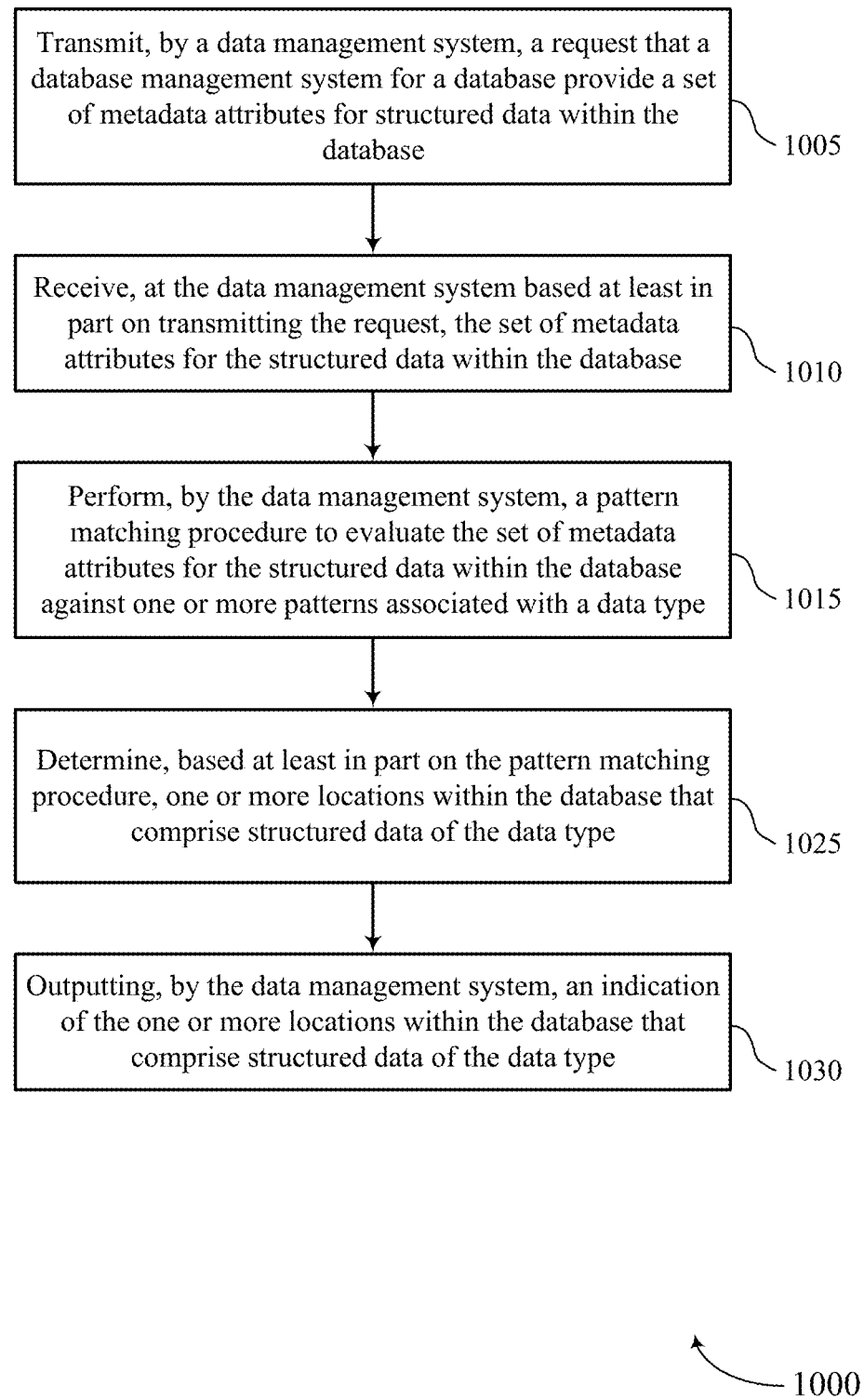

FIG. 10 shows a flowchart illustrating a method 1000 that supports sensitive data discovery for databases in accordance with aspects of the present disclosure. The operations of the method 1000 may be implemented by a Server or its components as described herein. For example, the operations of the method 1000 may be performed by a Server as described with reference to FIGS. 1 through 8. In some examples, a Server may execute a set of instructions to control the functional elements of the Server to perform the described functions. Additionally, or alternatively, the Server may perform aspects of the described functions using special-purpose hardware.

At 1005, the method may include transmitting, by a data management system, a request that a database management system for a database provide a set of metadata attributes for structured data within the database. The operations of 1005 may be performed in accordance with examples as disclosed herein. In some examples, aspects of the operations of 1005 may be performed by a metadata query component 730 as described with reference to FIG. 7.

At 1010, the method may include receiving, at the data management system based on transmitting the request, the set of metadata attributes for the structured data within the database. The operations of 1010 may be performed in accordance with examples as disclosed herein. In some examples, aspects of the operations of 1010 may be performed by a metadata query component 730 as described with reference to FIG. 7.

At 1015, the method may include performing, by the data management system, a pattern matching procedure to evaluate the set of metadata attributes for the structured data within the database against one or more patterns associated with a data type. The operations of 1015 may be performed in accordance with examples as disclosed herein. In some examples, aspects of the operations of 1015 may be performed by a pattern matching component 735 as described with reference to FIG. 7.

At 1020, the method may include determining, based on the pattern matching procedure, one or more locations within the database that include structured data of the data type. The operations of 1020 may be performed in accordance with examples as disclosed herein. In some examples, aspects of the operations of 1020 may be performed by a classification engine 740 as described with reference to FIG. 7.

At 1025, the method may include outputting, by the data management system, an indication of the one or more locations within the database that include structured data of the data type. The operations of 1025 may be performed in accordance with examples as disclosed herein. In some examples, aspects of the operations of 1025 may be performed by a classification results component 745 as described with reference to FIG. 7.

Figure 11:
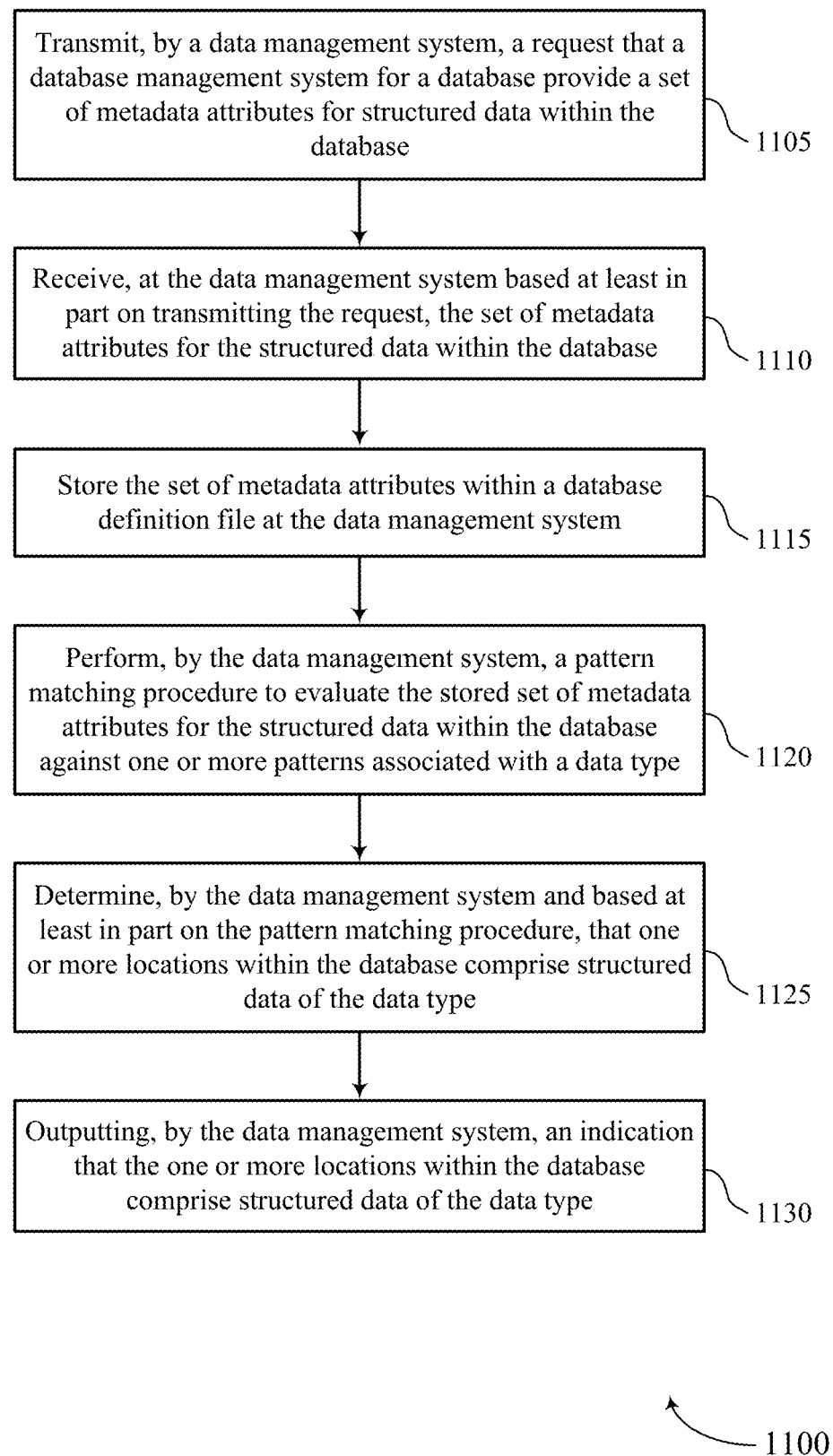

FIG. 11 shows a flowchart illustrating a method 1100 that supports sensitive data discovery for databases in accordance with aspects of the present disclosure. The operations of the method 1100 may be implemented by a Server or its components as described herein. For example, the operations of the method 1100 may be performed by a Server as described with reference to FIGS. 1 through 8. In some examples, a Server may execute a set of instructions to control the functional elements of the Server to perform the described functions. Additionally, or alternatively, the Server may perform aspects of the described functions using special-purpose hardware.

At 1105, the method may include transmitting, by a data management system, a request that a database management system for a database provide a set of metadata attributes for structured data within the database. The operations of 1105 may be performed in accordance with examples as disclosed herein. In some examples, aspects of the operations of 1105 may be performed by a metadata query component 730 as described with reference to FIG. 7.

At 1110, the method may include receiving, at the data management system based on transmitting the request, the set of metadata attributes for the structured data within the database. The operations of 1110 may be performed in accordance with examples as disclosed herein. In some examples, aspects of the operations of 1110 may be performed by a metadata query component 730 as described with reference to FIG. 7.

At 1115, the method may include storing the set of metadata attributes at the data management system. The operations of 1115 may be performed in accordance with examples as disclosed herein. In some examples, aspects of the operations of 1115 may be performed by a metadata storage component 755 as described with reference to FIG. 7.

At 1120, the method may include performing, by the data management system, a pattern matching procedure to evaluate the stored set of metadata attributes for the structured data within the database against one or more patterns associated with a data type. The operations of 1120 may be performed in accordance with examples as disclosed herein. In some examples, aspects of the operations of 1120 may be performed by a pattern matching component 735 as described with reference to FIG. 7.

At 1125, the method may include determining, by the data management system and based on the pattern matching procedure, that one or more locations within the database include structured data of the data type. The operations of 1125 may be performed in accordance with examples as disclosed herein. In some examples, aspects of the operations of 1125 may be performed by a classification engine 740 as described with reference to FIG. 7.

At 1130, the method may include outputting, by the data management system, an indication that the one or more locations within the database include structured data of the data type. The operations of 1130 may be performed in accordance with examples as disclosed herein. In some examples, aspects of the operations of 1130 may be performed by a classification results component 745 as described with reference to FIG. 7.

Figure 12:
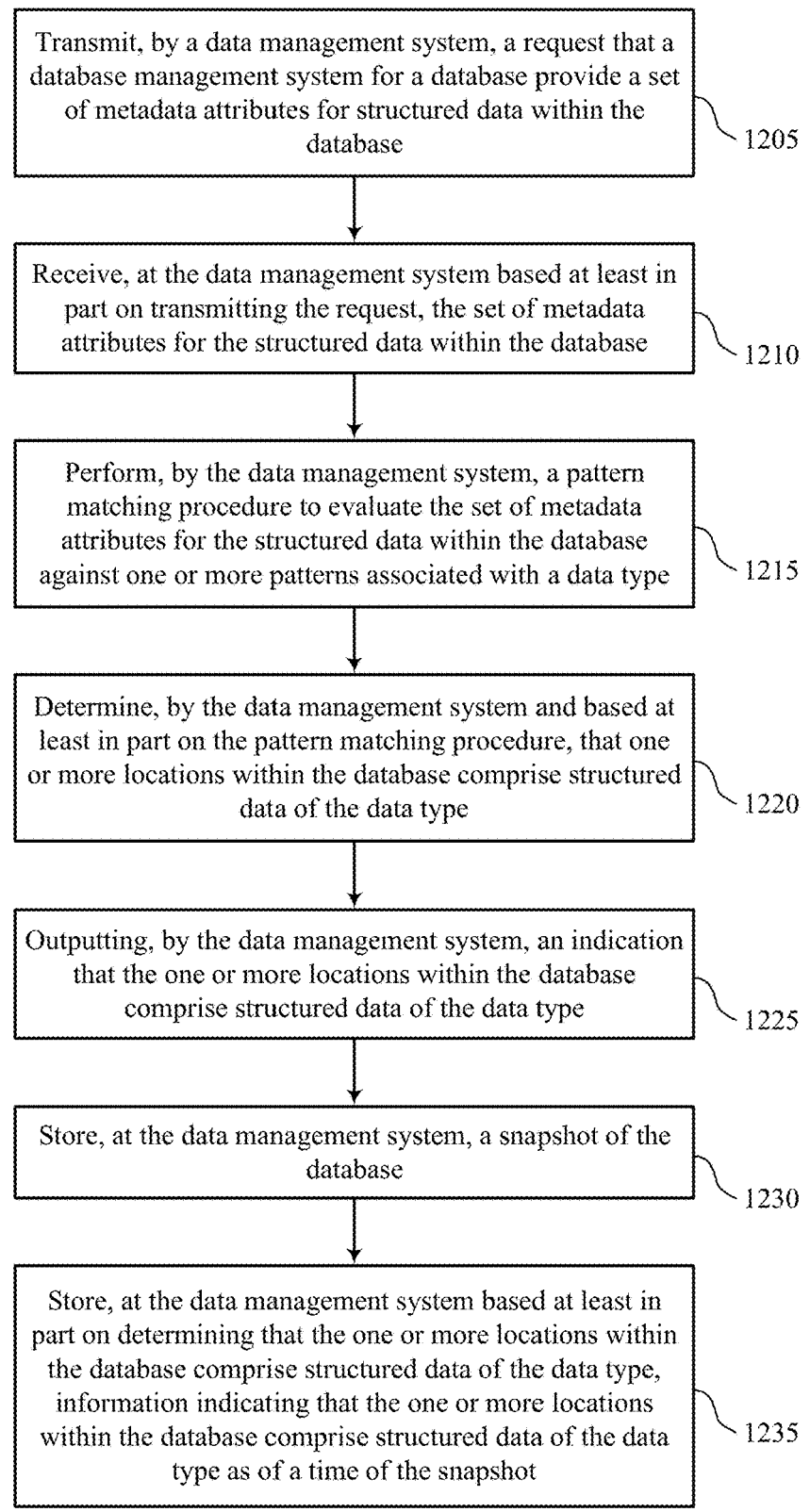

FIG. 12 shows a flowchart illustrating a method 1200 that supports sensitive data discovery for databases in accordance with aspects of the present disclosure. The operations of the method 1200 may be implemented by a Server or its components as described herein. For example, the operations of the method 1200 may be performed by a Server as described with reference to FIGS. 1 through 8. In some examples, a Server may execute a set of instructions to control the functional elements of the Server to perform the described functions. Additionally, or alternatively, the Server may perform aspects of the described functions using special-purpose hardware.

At 1205, the method may include transmitting, by a data management system, a request that a database management system for a database provide a set of metadata attributes for structured data within the database. The operations of 1205 may be performed in accordance with examples as disclosed herein. In some examples, aspects of the operations of 1205 may be performed by a metadata query component 730 as described with reference to FIG. 7.

At 1210, the method may include receiving, at the data management system based on transmitting the request, the set of metadata attributes for the structured data within the database. The operations of 1210 may be performed in accordance with examples as disclosed herein. In some examples, aspects of the operations of 1210 may be performed by a metadata query component 730 as described with reference to FIG. 7.

At 1215, the method may include performing, by the data management system, a pattern matching procedure to evaluate the set of metadata attributes for the structured data within the database against one or more patterns associated with a data type. The operations of 1215 may be performed in accordance with examples as disclosed herein. In some examples, aspects of the operations of 1215 may be performed by a pattern matching component 735 as described with reference to FIG. 7.

At 1220, the method may include determining, by the data management system and based on the pattern matching procedure, that one or more locations within the database include structured data of the data type. The operations of 1220 may be performed in accordance with examples as disclosed herein. In some examples, aspects of the operations of 1220 may be performed by a classification engine 740 as described with reference to FIG. 7.

At 1225, the method may include outputting, by the data management system, an indication that the one or more locations within the database include structured data of the data type. The operations of 1225 may be performed in accordance with examples as disclosed herein. In some examples, aspects of the operations of 1225 may be performed by a classification results component 745 as described with reference to FIG. 7.

At 1230, the method may include storing, at the data management system, a snapshot of the database. The operations of 1230 may be performed in accordance with examples as disclosed herein. In some examples, aspects of the operations of 1230 may be performed by a snapshot storage component 765 as described with reference to FIG. 7.

At 1235, the method may include storing, at the data management system based on determining that the one or more locations within the database include structured data of the data type, information indicating that the one or more locations within the database include structured data of the data type as of a time of the snapshot. The operations of 1235 may be performed in accordance with examples as disclosed herein. In some examples, aspects of the operations of 1235 may be performed by a backup service component 760 as described with reference to FIG. 7.

A method for database management is described. The method may include transmitting, by a data management system, a request that a database management system for a database provide a set of metadata attributes for structured data within the database, receiving, at the data management system based on transmitting the request, the set of metadata attributes for the structured data within the database, performing, by the data management system, a pattern matching procedure to evaluate the set of metadata attributes for the structured data within the database against one or more patterns associated with a data type, determining, by the data management system and based on the pattern matching procedure, that one or more locations within the database include structured data of the data type, and outputting, by the data management system, an indication that the one or more locations within the database include structured data of the data type.

An apparatus for database management is described. The apparatus may include a processor, memory coupled with the processor, and instructions stored in the memory. The instructions may be executable by the processor to cause the apparatus to transmit, by a data management system, a request that a database management system for a database provide a set of metadata attributes for structured data within the database, receive, at the data management system based on transmitting the request, the set of metadata attributes for the structured data within the database, perform, by the data management system, a pattern matching procedure to evaluate the set of metadata attributes for the structured data within the database against one or more patterns associated with a data type, determine, by the data management system and based on the pattern matching procedure, that one or more locations within the database include structured data of the data type, and outputting, by the data management system, an indication that the one or more locations within the database include structured data of the data type.

Another apparatus for database management is described. The apparatus may include means for transmitting, by a data management system, a request that a database management system for a database provide a set of metadata attributes for structured data within the database, means for receiving, at the data management system based on transmitting the request, the set of metadata attributes for the structured data within the database, means for performing, by the data management system, a pattern matching procedure to evaluate the set of metadata attributes for the structured data within the database against one or more patterns associated with a data type, means for determining, by the data management system and based on the pattern matching procedure, that one or more locations within the database include structured data of the data type, and means for outputting, by the data management system, an indication that the one or more locations within the database include structured data of the data type.

A non-transitory computer-readable medium storing code for database management is described. The code may include instructions executable by a processor to transmit, by a data management system, a request that a database management system for a database provide a set of metadata attributes for structured data within the database, receive, at the data management system based on transmitting the request, the set of metadata attributes for the structured data within the database, perform, by the data management system, a pattern matching procedure to evaluate the set of metadata attributes for the structured data within the database against one or more patterns associated with a data type, determine, by the data management system and based on the pattern matching procedure, that one or more locations within the database include structured data of the data type, and outputting, by the data management system, an indication that the one or more locations within the database include structured data of the data type.

In some examples of the method, apparatuses, and non-transitory computer-readable medium described herein, operations, features, means, or instructions for determining that one or more locations within the database include structured data of the data type may include operations, features, means, or instructions for determining, based on the pattern matching procedure, the one or more locations within the database that include structured data of the data type, and the indication indicates the one or more locations.

In some examples of the method, apparatuses, and non-transitory computer-readable medium described herein, operations, features, means, or instructions for performing the pattern matching procedure may include operations, features, means, or instructions for comparing the set of metadata attributes to the one or more patterns associated with the data type, where the set of metadata attributes includes metadata attributes associated with respective locations within the database, and operations, features, means, or instructions for determining, based on a match between at least a portion of a metadata attribute within the set of metadata attributes and a pattern of the one or more patterns, that a location associated with the metadata attribute includes structured data of the data type.

Some examples of the method, apparatuses, and non-transitory computer-readable medium described herein may further include operations, features, means, or instructions for receiving, via a user interface for the data management system, one or more inputs that indicate the one or more patterns associated with the data type.

In some examples of the method, apparatuses, and non-transitory computer-readable medium described herein, operations, features, means, or instructions for receiving the set of metadata attributes may include operations, features, means, or instructions for receiving information that indicates a name of the database, a schema of the database, names of tables within the database, names of table columns within the database, data types within the database, or quantities of data stored at locations within the database, or any combination thereof.

Some examples of the method, apparatuses, and non-transitory computer-readable medium described herein may further include operations, features, means, or instructions for storing the set of metadata attributes at the data management system, where the pattern matching procedure includes evaluating the stored set of metadata attributes against the one or more patterns.

Some examples of the method, apparatuses, and non-transitory computer-readable medium described herein may further include operations, features, means, or instructions for receiving, after outputting the indication that the one or more locations within the database include structured data of the data type, an indication that a location of the one or more locations does not store structured data of the data type.

Some examples of the method, apparatuses, and non-transitory computer-readable medium described herein may further include operations, features, means, or instructions for receiving an indication that structured data of the data type may be to be removed from the database, where transmitting the request that the database management system provide the set of metadata attributes, or outputting the indication that the one or more locations within the database include structured data of the data type, or both, may be in response to the indication that structured data of the data type may be to be removed from the database.

Some examples of the method, apparatuses, and non-transitory computer-readable medium described herein may further include operations, features, means, or instructions for identifying an adverse event for the database, where transmitting the request that the database management system provide the set of metadata attributes, or outputting the indication that the one or more locations within the database include structured data of the data type, or both, may be in response to the indication that structured data of the data type may be to be removed from the database.

Some examples of the method, apparatuses, and non-transitory computer-readable medium described herein may further include operations, features, means, or instructions for storing, at the data management system, a snapshot of the database, and operations, features, means, or instructions for storing, at the data management system based on determining that the one or more locations within the database include structured data of the data type, information indicating that the one or more locations within the database include structured data of the data type as of a time of the snapshot.

Some examples of the method, apparatuses, and non-transitory computer-readable medium described herein may further include operations, features, means, or instructions for receiving a request to restore the database based on the snapshot, and operations, features, means, or instructions for masking, in response to the request to restore the database, data associated with the one or more locations within the database based on the information indicating that the one or more locations within the database include structured data of the data type as of the time of the snapshot.

In some examples of the method, apparatuses, and non-transitory computer-readable medium described herein, operations, features, means, or instructions for masking the data associated with the one or more locations may include operations, features, means, or instructions for scrambling or refraining from restoring the data associated with the one or more locations.

In some examples of the method, apparatuses, and non-transitory computer-readable medium described herein, operations, features, means, or instructions for transmitting the request that the database management system provide the set of metadata attributes may further include operations, features, means, or instructions for transmitting the request that the database management system provide the set of metadata attributes based on backup schedule for the database.

In some examples of the method, apparatuses, and non-transitory computer-readable medium described herein, the data type may include personal identity information, personal financial information, personal medical information, personal biometric information, personal location information, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   obtaining, by a data management system configured to provide backup and recovery services for a database, a first snapshot of the database that represents a first state of the database as of a first time;

performing, by the data management system, a pattern matching procedure to evaluate a set of metadata attributes for data within the database against one or more patterns associated with a data type;

determining, by the data management system and based at least in part on the pattern matching procedure, that first locations within the database each comprise data of the data type as of the first time;

storing, by the data management system, the first snapshot and a set of classification results for the database, wherein the set of classification results is also associated with the first state of the database, and wherein the stored set of classification results indicates that the first locations within the database each comprise data of the data type as of the first time;

receiving, by the data management system after storing the set of classification results, a request to restore the database to the first state represented by the first snapshot of the database;

identifying, by the data management system using the stored set of classification results associated with the first state of the database, aspects of the first snapshot that correspond to the first locations within the database that each comprise data of the data type as of the first time; and performing a restoration procedure for the database in response to the request to restore the database to the first state represented by the first snapshot, wherein performing the restoration procedure for the database comprises:

scrambling or refraining from restoring data for the first locations based at least in part on the set of classification results indicating that the first locations store data of the data type such that the restoration procedure results in a version of the database that is modified relative to the first state represented by the first snapshot based at least in part on comprising scrambled data in the first locations or lacking data in the first locations.

2. The method of claim 1, wherein:

determining that the first locations within the database comprise data of the data type comprises determining, based at least in part on the pattern matching procedure, the first locations within the database that comprise data of the data type; and the set of classification results indicates the first locations.

3. The method of claim 2, wherein performing the pattern matching procedure comprises:

comparing the set of metadata attributes to the one or more patterns associated with the data type, wherein the set of metadata attributes comprises metadata attributes associated with respective locations within the database; and determining, based at least in part on a match between at least a portion of a metadata attribute within the set of metadata attributes and a pattern of the one or more patterns, that a location associated with the metadata attribute comprises data of the data type.

4. The method of claim 1, further comprising:

receiving, via a user interface for the data management system, one or more inputs that indicate the one or more patterns associated with the data type.

5. The method of claim 1, wherein the set of metadata attributes comprises a name of the database, a schema of the database, names of tables within the database, names of table columns within the database, data types within the database, or quantities of data stored at locations within the database, or any combination thereof.

6. The method of claim 1, further comprising:

storing the set of metadata attributes at the data management system, wherein the pattern matching procedure comprises evaluating the stored set of metadata attributes against the one or more patterns.

7. The method of claim 1, further comprising:

receiving, after outputting one or more indications that the first locations within the database comprise data of the data type, an indication that a first location from among the first locations does not store data of the data type.

8. The method of claim 1, further comprising:

receiving an indication that data of the data type is to be removed from the database, wherein scrambling or refraining from restoring data for the first locations is based at least in part on the indication that data of the data type is to be removed from the database.

9. The method of claim 1, further comprising:

identifying an adverse event for the database, wherein performing the pattern matching procedure is based at least in part on identifying the adverse event for the database.

10. The method of claim 1, further comprising:

transmitting, by the data management system, a request that a database management system provide the set of metadata attributes to the data management system based at least in part on a backup schedule for the database.

11. The method of claim 1, wherein the data type comprises:

personal identity information, personal financial information, personal medical information, personal biometric information, personal location information, or any combination thereof.

12. An apparatus, comprising:

at least one processor;

memory coupled with the at least one processor; and instructions stored in the memory and executable by the at least one processor to cause the apparatus to:

obtain, by a data management system configured to provide backup and recovery services for a database, a first snapshot of the database that represents a first state of the database as of a first time;

perform, by the data management system, a pattern matching procedure to evaluate a set of metadata attributes for data within the database against one or more patterns associated with a data type;

determine, by the data management system and based at least in part on the pattern matching procedure, that first locations within the database each comprise data of the data type as of the first time;

store, by the data management system, the first snapshot and a set of classification results for the database, wherein the set of classification results is also associated with the first state of the database, and wherein the stored set of classification results indicates that the first locations within the database each comprise data of the data type as of the first time;

receive, by the data management system after storing the set of classification results, a request to restore the database to the first state represented by the first snapshot of the database;

identify, by the data management system using the stored set of classification results associated with the first state of the database, aspects of the first snapshot that correspond to the first locations within the database that each comprise data of the data type as of the first time; and perform a restoration procedure for the database in response to the request to restore the database to the first state represented by the first snapshot, wherein, to perform the restoration procedure for the database, the instructions are executable by the at least one processor to cause the apparatus to:

scramble or refrain from restoring data for the first locations based at least in part on the set of classification results indicating that the first locations store data of the data type such that the restoration procedure results in a version of the database that is modified relative to the first state represented by the first snapshot based at least in part on comprising scrambled data in the first locations or lacking data in the first locations.

13. The apparatus of claim 12, wherein:

to determine that the first locations within the database comprise data of the data type, the instructions are executable by the at least one processor to cause the apparatus to determine, based at least in part on the pattern matching procedure, the first locations within the database that comprise data of the data type; and the set of classification results indicates the first locations.

14. The apparatus of claim 13, wherein, to perform the pattern matching procedure, the instructions are executable by the at least one processor to cause the apparatus to:

compare the set of metadata attributes to the one or more patterns associated with the data type, wherein the set of metadata attributes comprises metadata attributes associated with respective locations within the database; and determine, based at least in part on a match between at least a portion of a metadata attribute within the set of metadata attributes and a pattern of the one or more patterns, that a location associated with the metadata attribute comprises data of the data type.

15. The apparatus of claim 12, wherein the instructions are further executable by the at least one processor to cause the apparatus to:

receive, via a user interface for the data management system, one or more inputs that indicate the one or more patterns associated with the data type.

16. The apparatus of claim 12, wherein the set of metadata attributes comprises a name of the database, a schema of the database, names of tables within the database, names of table columns within the database, data types within the database, or quantities of data stored at locations within the database, or any combination thereof.

17. The apparatus of claim 12, wherein the instructions are further executable by the at least one processor to cause the apparatus to:

receive an indication that data of the data type is to be removed from the database, wherein the instructions are executable by the at least one processor to cause the apparatus to scramble or refrain from restoring data for the first locations based at least in part on the indication that data of the data type is to be removed from the database.

18. The apparatus of claim 12, wherein the instructions are further executable by the at least one processor to cause the apparatus to:

identify an adverse event for the database, wherein the instructions are executable by the at least one processor to cause the apparatus to perform the pattern matching procedure based at least in part on identifying the adverse event for the database.

19. The apparatus of claim 12, wherein the instructions are further executable by the at least one processor to cause the apparatus to:

transmit, by the data management system, a request that a database management system provide the set of metadata attributes to the data management system based at least in part on a backup schedule for the database.

20. A non-transitory computer-readable medium comprising instructions executable by at least one processor to:

obtain, by a data management system configured to provide backup and recovery services for a database, a first snapshot of the database that represents a first state of the database as of a first time;

perform, by the data management system, a pattern matching procedure to evaluate a set of metadata attributes for data within the database against one or more patterns associated with a data type;

determine, by the data management system and based at least in part on the pattern matching procedure, that first locations within the database each comprise data of the data type as of the first time;

store, by the data management system, the first snapshot and a set of classification results for the database, wherein the set of classification results is also associated with the first state of the database, and wherein the stored set of classification results indicates that the first locations within the database each comprise data of the data type as of the first time;

receive, by the data management system after storing the set of classification results, a request to restore the database to the first state represented by the first snapshot of the database;

identify, by the data management system using the stored set of classification results associated with the first state of the database, aspects of the first snapshot that correspond to the first locations within the database that each comprise data of the data type as of the first time; and perform a restoration procedure for the database in response to the request to restore the database to the first state represented by the first snapshot, wherein performing the restoration procedure for the database comprises:

scramble or refrain from restoring data for the first locations based at least in part on the set of classification results indicating that the first locations store data of the data type such that the restoration procedure results in a version of the database that is modified relative to the first state represented by the first snapshot based at least in part on comprising scrambled data in the first locations or lacking data in the first locations.

* * * * *